United States Patent [19]

Spry

[11] Patent Number: 4,986,635
[45] Date of Patent: Jan. 22, 1991

[54] HIGH EFFICIENCY NONLINEAR KERR EFFECT FILTER

[75] Inventor: Robert J. Spry, Tipp City, Ohio

[73] Assignee: The United States of America as represented by the Secretary of the Air Froce, Washington, D.C.

[21] Appl. No.: 925,858

[22] Filed: Oct. 31, 1986

[51] Int. Cl.$^5$ .............................................. G02B 5/24
[52] U.S. Cl. ..................................................... 350/311
[58] Field of Search ............... 350/311, 312, 313, 354, 350/1.5; 252/582

[56] References Cited

U.S. PATENT DOCUMENTS

| | | | |
|---|---|---|---|
| 3,458,249 | 7/1969 | George | 350/312 |
| 3,530,233 | 9/1970 | Chai et al. | 350/312 |
| 3,586,417 | 6/1971 | Fields | 350/312 X |
| 3,587,424 | 6/1971 | Paine et al. | 350/312 |
| 3,887,485 | 6/1975 | Neuroth | 252/300 |
| 3,888,646 | 6/1975 | Kuriyama et al. | 350/311 X |
| 3,951,520 | 4/1976 | Warin, Jr. | 350/312 X |
| 3,971,874 | 7/1976 | Ohta et al. | 428/432 |
| 3,999,144 | 12/1976 | Bret | 350/354 |
| 4,008,083 | 2/1977 | Pye | 350/312 |
| 4,042,304 | 8/1977 | Martin et al. | 356/128 |
| 4,074,482 | 2/1978 | Klahr | 52/171 |
| 4,099,854 | 7/1978 | Decker et al. | 350/312 |
| 4,114,985 | 9/1978 | Friedman | 350/266 |
| 4,307,942 | 12/1981 | Chahroudi | 350/353 |
| 4,410,239 | 10/1983 | Kaplan et al. | 350/354 |
| 4,431,257 | 2/1984 | Born | 350/1.5 |
| 4,501,472 | 2/1985 | Nicholson | 350/357 |
| 4,548,473 | 10/1985 | Lo et al. | 350/311 |

OTHER PUBLICATIONS

Strong, "Concepts of Classical Optics", 1958 pp. 583–585.
McAlister, "The Christiansen Light Filter: Its Advantages and Limitations", Smithsonian Misc. Collections, vol. 93, No. 7.
Barnes et al., "The Christiansen Filter Effect in the Infrared", Physical Review, vol. 49, 1936.
P. A. Hiltner and I. M. Krieger, "Diffraction of Light by Ordered Suspension", J. Phys. Chem. 73:7, 2386 (Jul. 1969).
P. A. Hiltner, Y. S. Papir, and I. M. Krieger, "Diffraction of Light by Nonaqueous Ordered Suspensions", J. Phys. Chem. 75:12, 1861 (1971).
T. Y. Chang, "Fast Self-Induced Refractive Index Changes in Optical Media: A Survey", Opt Eng. 20:2, 22 (Mar./Apr. 1981).
A. Kose et al., "Direct Observation of Ordered Latex Suspension by Metallurgical Microscope", J. Coll Int Sci. 44:2, 330 (Aug. 1973).
R. J. Carlson and S. A. Asher, "Characterization of Optical Diffraction and Crystal Structure in Monodisperse Polystyrene Colloids", Appl. Spect. 38:3, 298 (1984).
P. L. Flaugh, S. E. O'Donnell and S. A. Asher, "Development of a New Optical Wavelength Rejection Filter: Demonstration of Its Utility in Raman Spectroscopy", Appl. Spect 38:6, 847 (1984).
R. J. Spry and D. J. Kosan, "Theoretical Analysis of the Crystalline Colloidal Array Filter", Appl. Spect 40:6, 782 (1986).

Primary Examiner—Thomas H. Tarcza
Assistant Examiner—Mark Hellner
Attorney, Agent, or Firm—Bobby D. Scearce; Donald J. Singer

[57] ABSTRACT

An optical filter for blocking radiation of preselected wavelength is described which comprises a colloidal suspension of an optical medium and a multiplicity of microspheres of optical dimensions in a substantially regular three-dimensional array, the optical medium and microspheres comprising materials having matched indices of refraction in the absence of incident radiation, but at least one index of which varies nonlinearly with incident electric field whereby an index mismatch and resulting Bragg diffraction within the suspension is produced by incident radiation of the selected wavelength.

11 Claims, 1 Drawing Sheet

HIGH EFFICIENCY NONLINEAR KERR EFFECT FILTER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to laser hardened materials and structures, and more particularly to a novel optical filter structure for selectively blocking laser radiation of predetermined wavelength while passing radiation of other wavelengths.

The present invention provides a substantially improved optical reflection band filter which becomes reflective upon absorption of a certain amount of radiation by a laser beam of intensity I and wavelength $\lambda_0$. The invention is constructed by immersing a crystalline array of microspheres of optical dimensions within a nonlinear optical medium which fills the void between the microspheres of the crystalline array. The refractive index of the nonlinear medium is matched to the refractive index of the microspheres in the absence of laser irradiation, producing optical (i.e., relating to wavelengths within the optical spectra including the visible and near and mid infrared from about 0.3 to 2 microns, within which range the filter of the invention best functions) transparency at all wavelengths. Alternatively, the microspheres may be nonlinear in a linear medium, or the microspheres and medium may have diverging nonlinearity with incident electric field In these instances, laser irradiation causes an index mismatch between the microspheres and the surrounding medium, producing Bragg diffraction of laser light by the planes of the crystalline array. The filter structure defined by the teachings herein greatly enhances the efficiency of the inhomogeneous media Kerr effect filters through coherent diffraction of radiation rather than through incoherent scattering of radiation. The filter blocks laser radiation of selected characteristic wavelength $\lambda_0$ while allowing other wavelengths to pass. An optical system protected by the invention may therefore receive a broad spectrum of optical signals while being protected from an invasive, potentially destructive laser beam. In the absence of intense invasive laser radiation the filter is nominally transparent to all wavelengths. The invention demonstrates numerous advantages over standard quarter-wave interference stack filters, rugate interference filters, noncrystalline inhomogeneous media Kerr effect filters, linear crystalline array microsphere filters, and other wavelength responsive laser hardening filters. The filter structure taught herein may therefore find substantial utility in safety goggles, narrow band optical rejection filters, optical switches and limiters for signal and data processing applications and like optical devices and systems.

It is, therefor principal object of the invention to provide an improved optical filter.

It is a further object to provide an optical filter for blocking laser radiation of a preselected wavelength while passing radiation of other wavelengths.

It is yet another object to provide a switchable optical filter having fast response time.

It is a further object to provide a filter having a large absorbance value at the design wavelength.

It is a further object to provide an optical filter which is switchable at preselected impinging electrical field, has low absorption losses prior to switching, and is independent of impinging radiation prior to switching.

It is yet a further object to provide an optical switch having much greater efficiency than inhomogeneous media nonlinear Kerr effect filters.

These and other objects of the invention will become apparent as the description of representative embodiments proceeds.

SUMMARY OF THE INVENTION

In accordance with the foregoing principles and objects of the invention, an optical filter for blocking radiation of preselected wavelength is described which comprises a colloidal suspension of an optical medium and a multiplicity of microspheres of optical dimensions in a substantially regular three-dimensional array, the optical medium and microspheres comprising materials having matched indices of refraction in the absence of incident radiation, but at least one index of which varies nonlinearly with incident electric field whereby an index mismatch and resulting Bragg diffraction within the suspension is produced by incident radiation of the selected wavelength.

BRIEF DESCRIPTION OF THE DRAWINGS

The invention will be more clearly understood from the following detailed description of representative embodiments thereof read in conjunction with the accompanying drawings wherein.

DETAILED DESCRIPTION

Figure 1:
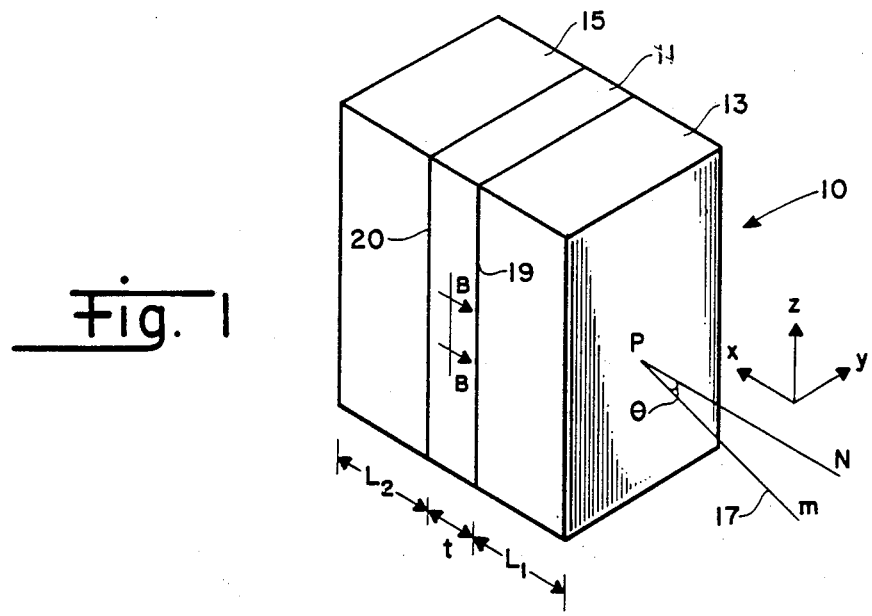
FIG. 1 is a fragmentary sectional view of an optical filter structure of the invention.

Referring now to FIG. 1, shown therein is a fragmentary sectional view of a filter 10 structure of the invention. Filter 10 comprises a thin layer 11 of a colloidal suspension disposed between two transparent plates 13,15 of respective thicknesses $L_1, L_2$. Plates 13,15 may comprise glass, plastic or other suitable transparent optical material as would be selected by one with skill in the field of the invention and guided by these teachings. The overall structure of filter 10 is substantially flat and, preferably, the respective thicknesses of plates 13,15 and layer 11 are substantially uniform. Plates 13,15 are oriented parallel to each other and to the y-z plane of the (arbitrary) set of reference axes displayed in FIG. 1. Accordingly, a light ray 17 incident along direction m impinges onto surface 14 of plate 13 at point P at an angle $\theta$ to a normal n (parallel to x axis) to surface 14, passes through filter 10 and exits plate 15 at a point thereon not shown in FIG. 1.

Figure 2:
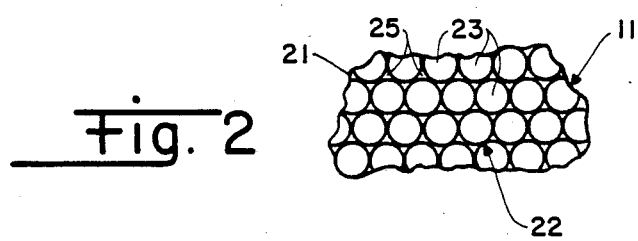
FIG. 2 is a fragmentary view along line B—B of FIG. 1.
Figure 3:
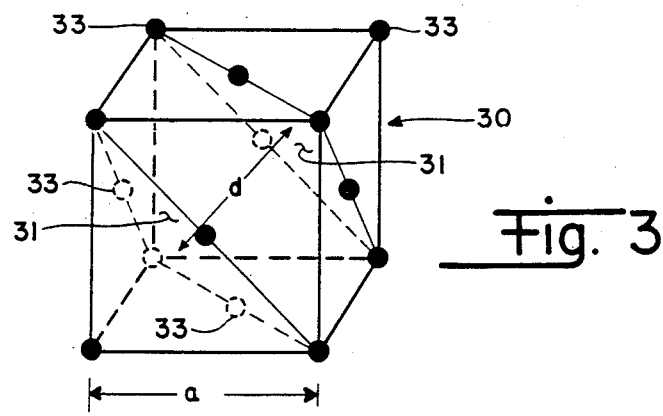
FIG. 3 is a perspective view of a unit cell of the face centered cubic lattice structure.

Layer 11 comprises a colloidal dispersion of thickness t between plates 13,15 and which may be held in the desired configuration by spacers 19,20 of suitable material such as Teflon ®, Nylon ®, rubber, or Mylar ®. Reference is how made additionally to FIG. 2 which is a view along line B—B of FIG. 1 showing a substantially enlarged sectional view of the colloidal suspension which layer 11 comprises. Suspension 21 comprises a crystalline array 22 (such as the face centered cubic structure of FIG. 3) of microspheres 23 of optical dimensions (viz., about 10 to 1000 nm) immersed within an optical medium 25 which fills the voids between microspheres 23 of array 22; optical medium 25 has refractive index which varies with impinging electric field according to a mathematical relationship differently than does that of the material comprising microspheres 23. Preferably microspheres 23, characterized by a substantially linear relationship with electric field, are immersed in a nonlinear medium 25, although microsphere 23 may be nonlinear in a linear medium or in a medium having nonlinearity which diverges with respect to that of microspheres 23. Microspheres 23 may comprise any suitable material which may be made spherical in optical dimensions, is not soluble in the surrounding medium 25, has long range attractive forces associated with the individual microspheres which promotes stacking of microspheres 23 in any array imitating a close-packed or body-centered crystalline structure, and has an index of refraction which may be substantially matched by a suitable medium 25. Suitable materials for microspheres may therefore include polystyrene, silicon dioxide, II–VI semiconductors, III–V semiconductors, silicon, germanium, liquid crystals, encapsulated organic dyes, and other nonlinear organics and nonlinear polymers and like materials.

Microspheres 23 may be prepared by any suitable method known in the art, such as that described by Carlson et al, Appl Spectrosc 38:3, 297 (1984). After washing and rinsing (in such as a mixed-bed ion exchange resin and doubly distilled water according to Carlson and Asher), microspheres 23 are left with an electrostatic charge the interaction of which between microspheres 23 results in stacking of the microspheres in the crystalline structure such as that depicted in FIG. 2. At high concentrations, microspheres 23 condense in a face centered cubic (fcc) type structure or in a hexagonal close-packed (hcp) structure, and at low concentrations in a body centered cubic (bcc) type structure. The discussion following presupposes an fcc type structure although a similar development may be made by one guided by these teachings and presupposing a low concentration bcc type structure or a hcp type structure. Consider therefore the representative fcc structure 30 depicted in FIG. 3 wherein the (111) planes 31 are assumed to be aligned parallel to the faces of plates 13,15 in the structure of filter 10 (FIG. 1). The spacing d between adjacent (111) planes 31 is related to the lattice constant a of the fcc lattice as:

$$d = a/\sqrt{3} \quad (1)$$

If $D_0$ is the diameter of the microspheres 23 (33 in FIG. 3), the fractional volume ($V_f$) for the fcc lattice is:

$$V_f = \frac{2}{3}\pi \left[\frac{D_0}{a}\right]^3. \quad (2)$$

Assume for example a nonlinear medium 25 is selected to have a refractive index which is matched to that of the linear microspheres 23 in the absence of laser radiation, and produces substantial optical transparency at all wavelengths. When laser irradiated, the index of the nonlinear medium changes according to $$n = n_0 + (n_2) (I) \quad (3)$$

where $n_0$ is the refractive index of both the microspheres and of the nonlinear medium without laser irradiation, and $n_2$ is the nonlinear refractive index coefficient of the void-filling medium. Upon laser irradiation, the mismatch between the refractive index of the microspheres and the refractive index of the nonlinear medium causes the laser light to be Bragg diffracted by the planes of the crystalline array. Accordingly, medium 25 may comprise any material which is compatible with supporting a stable crystalline like structure of microspheres 23 and which has a large nonlinear refractive index coefficient $n_2$ and a matching $n_0$, including water, toluene, benzene, chloroform, nitrobenzene, carbon disulfide, α-chloronaphthalene, or mixtures thereof, although other suitable materials may be used as would occur to the skilled artisan guided by these teachings. For example, microspheres 23 of polystyrene ($n_0 = 1.59$) could be matched by a mixture of nitrobenzene ($n_0 = 1.55$) and either carbon disulfide ($n_0 = 1.61$) or α-chloronaphthalene ($n_0 = 1.63$). Microspheres 23 of lucite ($n_0 = 1.49$) may be substantially matched by benzene ($n_0 = 1.49$) alone, or fine tuned by mixing with toluene ($n_0 = 1.43$) or nitrobenzene. Most large values of $n_2$ in liquids are produced by the molecular orientation Kerr effect.

Upon laser irradiation, the index of the nonlinear medium varies according to Eq (3). The laser light is Bragg-diffracted off the planes of the microsphere crystal structure according to the relationship:

$$k\lambda_0 = 2nd \sin\left(\frac{\pi}{2} - \theta\right), \quad (4)$$

where k is the diffraction order. If the filter reflection band is centered about $\lambda_0$ for normally incident light, then the wavelength shift of the center of the band is governed by:

$$\frac{\delta\lambda}{\lambda_0} = \quad (5)$$

$$\left\{\sqrt{1 - \left[\frac{\sin\theta}{n}\right]^2} - 1\right\} \approx -\frac{1}{2}\left[\frac{\sin\theta}{n}\right]^2 \approx -\frac{1}{2}\frac{\theta^2}{n^2}.$$

The calculation of the peak reflectivity and bandwidth is a very complex problem, the solution to which is provided in Spry et al, Appl Spectrosc 40:6, 782 (1986). The peak absorbance of the linear crystalline microsphere array filter is known experimentally to be greater than $10^{11}$ while the fractional bandwidth is experimentally 12 nm/514.5 nm = 0.0233. This unusually large peak absorbance exceeds that of even the famous rugate designs.

The foregoing development was based on the assumption of a linear microsphere material and nonlinear medium. As mentioned previously, the microspheres may be nonlinear and the medium may be linear, or both may be nonlinear with refractive indices showing divergent functions with imposed electric field. Equivalent developments to the foregoing may therefore be made based on each of the latter two arrangements, the same contemplated herein as alternative embodiments of the invention.

Consider as an example that a nonlinear Kerr effect filter according to the invention is desired to protect a system against laser radiation at a wavelength of 0.53 micron. Linear crystalline array filters (see e.g., Flaugh et al, Appl Spectrosc 38:6, 84 (1984)) of polystyrene spheres in water have a refractive index difference $\Delta n$ of 0.26 between the polystyrene ($n_P = 1.59$) and the water ($n_w = 1.33$). In a filter of the invention, a value for $\Delta n$ of about 0.1 or less allows Bragg diffraction to occur efficiently. Consider therefore a filter of polystyrene microspheres immersed in a mixture of carbon disulfide and nitrobenzene The value of $n_2$ for the mixture is about $1.0 \times 10^{-11}$ esu. The threshold intensity may be calculated from Eq (3):

$$I = \frac{n - n_o}{n_2} = \frac{0.1}{1.0 \times 10^{-11} \, esu} = 10^{10} \, esu = 10^3 \, w/cm^2 \quad (6)$$

The required lattice spacing d between Bragg planes is calculated from Eq (4) for normal incidence ($\theta = 0$) and first order diffraction ($k = 1$) as $d = \lambda_0/2n = 0.199$ micron in the example. From Eq (1) the corresponding lattice constant a is 0.344 micron. The desired thickness for the filter can be estimated by assuming $t = 2000$ layers in the colloidal suspension (after Flaugh et al, supra), or, t should be about 398 microns.

Flaugh et al constructed their filter with a fractional volume $V_f$ (polystyrene to water) of 4.22%. Kose et al (J Colloid Int Sci 44:2, 330 (1973)) found that crystalline order is maintained down to $V_f$ of about 1.5%. Assuming a $V_f$ for the filter of the example of 4.0%, from Eq (2):

$$D_o = a \left[ \frac{3V_f}{2\pi} \right]^{\frac{1}{3}} = 0.267 \, a = 920 \, \text{Å} = 0.092 \, \text{micron}$$

In order to calculate the maximum incidence angle at which Bragg diffraction in the first order obtains, assume that the wavelength shift $\delta\lambda$ of the reflection band peak must be less than one-half the bandwidth $\Delta\lambda$. From Eq (5), $$\theta_{max} = n[\Delta\lambda/\lambda_0]^{\frac{1}{2}}$$

and, using a value for $\Delta\lambda/\lambda_0 = 0.0233$ after Flaugh et al, $\theta_{max}$ for the example is equal to 11.7° which is acceptable for many practical uses of the filter of the invention.

In the representative embodiments of the invention described herein, the filter in the switched state blocks radiation in a narrow wavelength band $\Delta\lambda$ centered on the design wavelength $\lambda_0$; substantially all other wavelengths are passed. The filter is operable to block wavelengths in the range of from about 0.2 micron to about 20 microns although because of the transmittance properties of the common materials (e.g., water) which comprise the invention, the filter operates best in the visible and near infrared spectral region from about 0.3 micron to about 2 microns. In the unswitched state, the filter passes substantially all wavelengths. An optical system protected by the filter may continuously operate safely in receiving signals of wavelengths other than $\lambda_0$ after switching.

The present invention, as hereinabove described, therefore provides an optical filter for reflecting radiation of preselected wavelength while passing other wavelengths. The response of the filter is substantially wavelength independent prior to switching. Radiation is blocked only within a narrow band centered on the preselected design wavelength and, therefore, an optical system protected by the filter may receive a broad spectrum of signals while being protected from destructive invasive radiation at the preselected wavelength. Matching of refractive index of the microspheres with the surrounding medium provides negligible absorption losses of the filter in the unswitched state. The filter may be constructed to have extremely large ($>11$) absorbance value at the design wavelength. The filter may be configured in substantially any size, and is effective in its function at moderate angles of incidence of impinging radiation. The invention may therefore find substantial use as a protective optical filter against laser weapons.

It is understood that certain modifications to the invention as described may be made, as might occur to one with skill in the field of the invention, within the scope of the appended claims. Therefore, all embodiments contemplated hereunder which achieve the objects of the invention have not been shown in complete detail. Other embodiments may be developed without departing from the spirit of the invention or from the scope of the appended claims.

I claim:

1. An optical filter for selectively blocking radiation of preselected wavelength, comprising:
   (a) a colloidal suspension of an optical medium and a multiplicity of microspheres of having preselected diameter in the range of from about 10 to about 1000 nanometers supported within said medium in a substantially regular three dimensional array;
   (b) said microspheres comprising a first material having a first index of refraction which varies with incident electric field according to a first relationship;
   (c) said medium comprising a second material having a second index of refraction which varies with incident electric field according to a second relationship different and divergent from said first relationship; and
   (d) wherein at least one of said first relationship and said second relationship is nonlinear and wherein said first index of refraction is substantially equal to said second index of refraction in the absence of incident radiation on said suspension.

2. The filter as recited in claim 1 wherein said medium comprises a material selected from the group consisting of water, toluene, benzene, chloroform, nitrobenzene, carbon disulfide, and $\alpha$-chloronaphthalene.

3. The filter as recited in claim 1 wherein said microspheres comprise a material selected from the group consisting of polystyrene, silicon dioxide, II-VI semiconductors, III-V semiconductors, silicon, germanium, liquid crystals and encapsulated organic dyes.

4. The filter as recited in claim 1 wherein said three-dimensional array is close packed.

5. The filter as recited in claim 1 wherein said colloidal suspension is a layer of predetermined thickness.

6. The filter as recited in claim 5 further comprising a substrate supporting said layer, said substrate comprising an optically transparent material.

7. An optical filter for selectively blocking radiation of predetermined wavelength, comprising:
   (a) a substrate of substantially optically transparent material;
   (b) a colloidal suspension of an optical medium and a multiplicity of microspheres of having preselected diameter in the range of from about 10 to about 1000 nanometers supported within said medium in a substantially regular three dimensional array;

(c) said microspheres comprising a first material having a first index of refraction which varies with incident electric field according to a first relationship;

(d) said medium comprising a second material having a second index of refraction which varies with incident electric field according to a second relationship different and divergent from said first relationship; and (e) wherein at least one of said first relationship and said second relationship is nonlinear and wherein said first index of refraction is substantially equal to said second index of refraction in the absence of incident radiation on said suspension.

8. The filter is recited in claim 7 wherein said medium comprises a material selected from the group consisting of water, toluene, benzene, chloroform, nitrobenzene, carbon disulfide, and α-chloronaphthalene.

9. The filter as recited in claim 7 wherein said microspheres comprise a material selected from the group consisting of polystyrene, silicon dioxide, II–VI semiconductors, III–V semiconductors, silicon, germanium, liquid crystals and encapsulated organic dyes.

10. The filter as recited in claim 7 wherein said three-dimensional array is close packed.

11. The filter as recited in claim 7 wherein said colloidal suspension is a layer of predetermined thickness.

* * * * *